(12) United States Patent
McCarthy et al.

(10) Patent No.: US 8,425,762 B2
(45) Date of Patent: Apr. 23, 2013

(54) AROMATIC HYDROGENATION PROCESS

(75) Inventors: Stephen J. McCarthy, Center Valley, PA (US); Wenyih Frank Lai, Bridgewater, NJ (US); Michel A. Daage, Hellertown, PA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 780 days.

(21) Appl. No.: 12/316,673

(22) Filed: Dec. 16, 2008

(65) Prior Publication Data

US 2009/0206004 A1    Aug. 20, 2009

Related U.S. Application Data

(60) Provisional application No. 61/009,247, filed on Dec. 27, 2007.

(51) Int. Cl.
*C10G 45/52* (2006.01)
*C10G 65/08* (2006.01)
*B01J 21/06* (2006.01)

(52) U.S. Cl.
USPC ............... 208/143; 208/88; 208/89; 208/142; 208/144; 208/145; 502/66; 502/242; 502/261; 502/262

(58) Field of Classification Search .......... 208/124–145, 208/88, 89; 502/63, 64, 66, 258, 261, 262, 502/242
See application file for complete search history.

(56) References Cited

U.S. PATENT DOCUMENTS

| 5,573,657 | A | 11/1996 | Degnan et al. | |
|---|---|---|---|---|
| 6,413,902 | B1 * | 7/2002 | Pinnavaia et al. | 502/167 |
| 6,884,339 | B2 * | 4/2005 | Benazzi et al. | 208/58 |
| 2006/0070916 | A1 * | 4/2006 | McCarthy et al. | 208/143 |
| 2006/0096892 | A1 * | 5/2006 | McCarthy et al. | 208/143 |

OTHER PUBLICATIONS

U.S. Appl. No. 11/205,640, McCarthy et al, commonly owned patent application filed Aug. 17, 2005.

* cited by examiner

*Primary Examiner* — Walter D Griffin
*Assistant Examiner* — Renee E Robinson
(74) *Attorney, Agent, or Firm* — Robert A. Migliorini

(57) ABSTRACT

An MCM-41 catalyst having a crystalline framework containing $SiO_2$ and a Group IV metal oxide, such as $TiO_2$ or $ZrO_2$ is provided. The catalyst is low in acidity and is suitable for use in processes involving aromatic saturation of hydrocarbon feedstocks.

22 Claims, 7 Drawing Sheets

US 8,425,762 B2

AROMATIC HYDROGENATION PROCESS

CROSS REFERENCE TO RELATED APPLICATION

This application claims the benefit of U.S. Provisional 61/009,247 filed Dec. 27, 2007.

FIELD OF THE INVENTION

This invention relates to a novel catalyst and use of the catalyst for processing of hydrocarbon feedstreams that contain aromatics.

BACKGROUND OF THE INVENTION

Historically, hydrofinishing technologies have used both base and noble metal catalysts on an amorphous support. With noble metal catalysts, excellent color and oxidation stability can be achieved at lower pressures and temperatures with smaller reactor volumes than those required when using base metal catalysts. At higher processing temperatures, color quality is sacrificed to achieve sufficient oxidation stability. With noble metal catalysts, it is possible to get superior color stability (water-white), excellent oxidation stability, and almost complete removal of aromatics. However, noble metal catalysts are poisoned by sulfur and are only used to hydrofinish feeds containing very low levels of sulfur.

U.S. Patent Application Publication 2006/0070917 describes a process for hydrogenating lube oil boiling range feedstreams using a catalyst comprising at least one Group VIII noble metal selected from Pt, Pd, and mixtures thereof on a support material having an average pore diameter of about 15 to less than about 40 Å. The support material for the at least one Group VIII noble metal can include MCM-41 mesoporous support materials, such as MCM-41 support materials composed of $SiO_2$ and $Al_2O_3$.

There is still a need in the art for improved catalysts and/or processes for hydrofinishing and aromatic saturation of hydrocarbon feeds.

SUMMARY OF THE INVENTION

In an embodiment, a process is provided for aromatics hydrogenation of a hydrocarbon feedstream. The process includes contacting a hydrocarbon feedstream that contains aromatics with a hydrogenation catalyst in the presence of a hydrogen-containing treat gas in a first reaction stage operated under effective aromatics hydrogenation conditions. The hydrogenation catalyst includes an inorganic porous crystalline phase material having, after calcination, a hexagonal arrangement of uniformly-sized pores having diameter of at least about 15 Angstroms and exhibiting a hexagonal diffraction pattern that can be indexed with a $d_{100}$ value greater than about 18 Angstroms. The inorganic porous crystalline phase material contains $SiO_2$ and $XO_2$, where X is a Group IV metal, and the inorganic porous crystalline phase material is formed from a synthesis mixture having a ratio of $SiO_2:XO_2$ of about 100:1 or less. The hydrogenation catalyst also includes at least one hydrogenation-dehydrogenation component selected from the Group VIII noble metals.

In another embodiment, a process for aromatics hydrogenation of a hydrocarbon feedstream is provided. The process includes contacting a hydrocarbon feedstream containing aromatics, nitrogen and organically bound sulfur contaminants in a first reaction stage operated under effective hydrotreating conditions and in the presence of hydrogen-containing treat gas with a hydrotreating catalyst comprising about at least one Group VIII metal oxide and at least one Group VI metal oxide. This produces a reaction product comprising at least a vapor product and a liquid hydrocarbon product. The reaction product is contacted with a hydrogenation catalyst in the presence of a hydrogen-containing treat gas in a second reaction stage operated under effective aromatics hydrogenation conditions. The hydrogenation catalyst includes an MCM-41 support material having a crystalline framework that contains $SiO_2$ and $XO_2$, where X is a Group IV metal. The MCM-41 support material is formed from a synthesis mixture having a ratio of $SiO_2:XO_2$ in the synthesis mixture of 100:1 or less. The hydrogenation catalyst also includes at least one hydrogenation-dehydrogenation component selected from the Group VIII noble metals.

In still another embodiment, a method for hydroprocessing a hydrocarbon feedstream is provided. The method includes contacting a hydrocarbon feedstream containing aromatics in a first reaction stage operated under effective catalytic dewaxing conditions and in the presence of hydrogen-containing treat gas with a dewaxing catalyst thereby producing a reaction product. The reaction product is then contacted with a hydrogenation catalyst in the presence of a hydrogen-containing treat gas in a second reaction stage operated under effective aromatics hydrogenation conditions. The hydrogenation catalyst includes an MCM-41 support material having a crystalline framework that contains $SiO_2$ and $XO_2$, where X is a Group IV metal, the MCM-41 support material being formed from a synthesis mixture having a ratio of $SiO_2:XO_2$ in the synthesis mixture of 100:1 or less. The hydrogenation catalyst also includes at least one hydrogenation-dehydrogenation component selected from the Group VIII noble metals.

In yet another embodiment, a method for hydroprocessing a hydrocarbon feedstream is provided. The method includes contacting a hydrocarbon feedstream containing aromatics in a first reaction stage with a hydrogenation catalyst in the presence of a hydrogen-containing treat gas operated under effective aromatics hydrogenation conditions thereby producing a reaction product. The hydrogenation catalyst includes an MCM-41 support material having a crystalline framework that contains $SiO_2$ and $XO_2$, where X is a Group IV metal, the MCM-41 support material being formed from a synthesis mixture having a ratio of $SiO_2:XO_2$ in the synthesis mixture of 100:1 or less. The hydrogenation catalyst also includes at least one hydrogenation-dehydrogenation component selected from the Group VIII noble metals. The reaction product is then contacted in a second reaction stage operated under effective catalytic dewaxing conditions and in the presence of hydrogen-containing treat gas with a dewaxing catalyst.

DETAILED DESCRIPTION OF THE INVENTION

Figure 1:
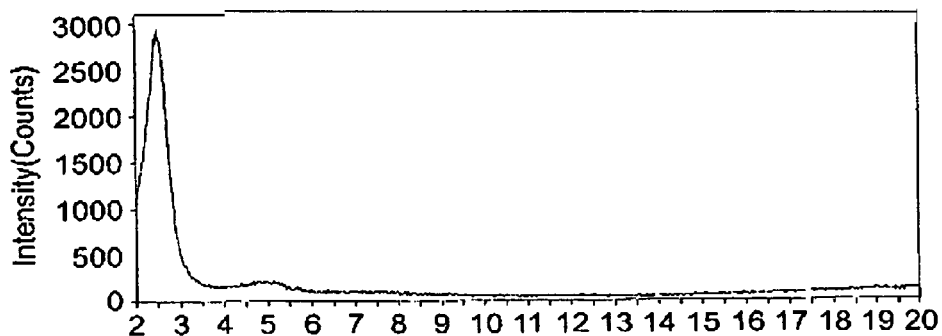
FIGS. 1-4 depict X-ray Diffraction spectra of crystalline support materials according to the invention.

This invention provides an improved catalyst and method for hydrogenation of hydrocarbon feedstreams that contain aromatics. The inventive catalyst includes a support composed of an inorganic, porous, non-layered crystalline phase material (such as MCM-41) having a Group IV metal, such as titanium or zirconium, incorporated into a crystalline framework that is composed primarily of silica. The presence of titanium and/or zirconium in the framework unexpectedly improves the performance of the catalyst for hydrogenation and/or saturation of aromatics relative to catalysts having only silica or silica and alumina incorporated in the framework, without increasing the acidity of the catalyst. Preferably, the inventive catalyst also includes Pt, Pd, or a mixture thereof supported on the titanium-containing or zirconium-containing support. The support can optionally be bound with one or more binders, such as alumina, silica, titania, yttria, zirconia, gallium oxide, silica-alumina, or combinations thereof.

The inventive support, when combined with a hydrogenation-dehydrogenation component, will be referred to as a hydrogenation catalyst below, with the understanding that a hydrogenation catalyst can be used for both hydrogenation and aromatic saturation of a feedstream. Similarly, a hydrogenation process can refer to either hydrogenation or aromatic saturation of a feedstream.

Feedstreams suitable for hydrogenation by the inventive catalyst include any conventional hydrocarbon feedstreams where hydrogenation or aromatic saturation is desirable. Such feedstreams can include hydrocarbon fluids, diesel, kerosene, and lubricating oil feedstreams. Such feedstreams can also include other distillate feedstreams, including wax-containing feedstreams such as feeds derived from crude oils, shale oils and tar sands. Synthetic feeds such as those derived from the Fischer-Tropsch process can also be aromatically saturated using the inventive catalyst. Typical wax-containing feedstocks for the preparation of lubricating base oils have initial boiling points of about 315° C. or higher, and include feeds such as reduced crudes, hydrocrackates, raffinates, hydrotreated oils, atmospheric gas oils, vacuum gas oils, coker gas oils, atmospheric and vacuum residues, deasphalted oils, slack waxes and Fischer-Tropsch wax. Such feeds may be derived from distillation towers (atmospheric and vacuum), hydrocrackers, hydrotreaters and solvent extraction units, and may have wax contents of up to 50% or more. Preferred lubricating oil boiling range feedstreams include feedstreams which boil in the range of 570-760° F. Diesel boiling range feedstreams include feedstreams which boil in the range of 480-660° F. Kerosene boiling range feedstreams include feedstreams which boil in the range of 350-617° F.

Hydrocarbon feedstreams suitable for use herein also contain aromatics and nitrogen- and sulfur-contaminants. Feedstreams containing up to 0.2 wt. % of nitrogen, based on the feedstream, up to 3.0 wt. % of sulfur, and up to 50 wt. % aromatics can be used in the present process In various embodiments, the sulfur content of the feedstreams can be below about 500 wppm, or below about 300 wppm, or below about 200 wppm, or below about 100 wppm, or below about 20 wppm. The pressure used during an aromatic hydrogenation process can be modified based on the expected sulfur content in a feedstream. Feeds having a high wax content typically have high viscosity indexes of up to 200 or more. Sulfur and nitrogen contents may be measured by standard ASTM methods D5453 and D4629, respectively.

In an embodiment, the invention involves a catalyst, and a method for contacting a hydrocarbon feedstream with such a catalyst, that comprises a support material, a binder material, and at least one hydrogenation-dehydrogenation component. Preferably, the support material is an inorganic, porous, non-layered crystalline phase material that is characterized (in its calcined form) by an X-ray diffraction pattern with at least one peak at a d-spacing greater than about 18 Å with a relative intensity of 100. Preferably, the support material is also characterized as having a benzene sorption capacity greater than 15 grams of benzene per 100 grams of the material at 50 torr (6.67 kPa) and 25° C. Preferably, the support material has a hexagonal arrangement of uniformly-sized pores with a maximum perpendicular cross-section pore dimension of at least about 15 to less than about 100 Å. More preferably, the support material is an MCM-41 support material. MCM-41 has a characteristic structure of hexagonally-arranged, uniformly-sized pores of at least 13 Å diameter, and exhibits a hexagonal electron diffraction pattern that can be indexed with a $d_{100}$ value greater than about 18 Å, which corresponds to at least one peak in the X-ray diffraction pattern. MCM-41 is also described in U.S. Pat. Nos. 5,098,684, 5,573,657, and 5,837,639.

Generally, crystalline support materials according to the invention have a composition according to the formula $M_{n/q}$ $(W_aX_bY_cZ_dO_h)$. In this formula, W is a divalent element, selected from divalent first row transition metal, preferably manganese, cobalt, iron, and/or magnesium, more preferably cobalt. X is a trivalent element, preferably aluminum, boron, iron and/or gallium, more preferably aluminum. Y is a tetravalent element such as silicon, titanium, zirconium and/or germanium, preferably silicon and titanium. Z is a pentavalent element, such as phosphorus. M is one or more ions, such as, for example, ammonium, Group IA, IIA and VIIB ions, usually hydrogen, sodium and/or fluoride ions. "n" is the charge of the composition excluding M expressed as oxides; q is the weighted molar average valence of M; n/q is the number of moles or mole fraction of M; a, b, c, and d are mole fractions of W, X, Y and Z, respectively; h is a number of from 1 to 2.5; and (a+b+c+d)=1. In a preferred embodiment of crystalline support materials suitable for use herein, a and d=0, and h=2. In a preferred embodiment, such a crystalline support material is an MCM-41 support material.

In the as-synthesized form, the support materials suitable for use herein have a composition, on an anhydrous basis, expressed empirically by the formula $rRM_{n/q}$ $(W_aX_bY_cZ_dO_h)$, where R is the total organic material not included in M as an ion, and r is the coefficient for R, i.e., the number of moles or mole fraction of R. The M and R components are associated with the material as a result of their presence during crystallization, and are easily removed or, in the case of M, replaced by post-crystallization methods described below. To the extent desired, the original M, e.g., sodium or chloride, ions of the as-synthesized material of this invention can be replaced in accordance with conventional ion-exchange techniques. Preferred replacing ions include metal ions, hydrogen ions, hydrogen precursor, e.g., ammonium, ions and mixtures of these ions. Particularly preferred ions are those which provide the desired metal functionality in the final catalyst. These include hydrogen, rare earth metals and metals of Groups VIIA (e.g., Mn), VIIIA (e.g., Ni), IB (e.g., Cu), IVB (e.g., Sn) of the Periodic Table of the Elements and mixtures of these ions.

In the description below, formation of crystalline support materials will be described with respect to a synthesis mixture containing specified ratios of materials. For example, the materials can include a source of silica ($SiO_2$), a source of alumina ($Al_2O_3$), a source of titania ($TiO_2$), or a source of zirconia ($ZrO_2$). One way to refer to the mixtures is simply to refer to the ratio used of each component. For example, for a synthesis mixture that contains both silica and titania, the ratio of $SiO_2$ to $TiO_2$ can be 100:1 or less. Note, however, that the basic unit for alumina, $Al_2O_3$, contains 2 aluminum atoms, while $TiO_2$ and $ZrO_2$ contain only one metal atom respectively. To account for this when making comparisons between mixtures containing alumina and mixtures containing titania or zirconia, the examples below will sometimes refer to a ratio of $SiO_2$ to $(TiO_2)_2$ or $(ZrO_2)_2$. It can be readily seen that a ratio of $SiO_2$ to $TiO_2$ of 100:1 is the same as a ratio of $SiO_2$ to $(TiO_2)_2$ of 200:1.

In various embodiments, the crystalline support materials used in the invention are formed from synthesis mixtures containing specified ratios of $SiO_2$ to $(TiO_2)_2$. In such embodiments, the synthesis mixture used to form the crystalline support materials has a $SiO_2$ to $(TiO_2)_2$ ratio of 200:1 or less, or 150:1 or less, or 120:1 or less, or 100:1 or less, or 90:1 or less, or 80:1 or less, or 60:1 or less, or 50:1 or less, or 30:1 or less. As described above, these ratios correspond to $SiO_2$ to $TiO_2$ ratios ranging from 100:1 or less down to 15:1 or less. In other embodiments, the support materials are formed from synthesis mixtures having a $SiO_2$ to $(TiO_2)_2$ ratio of at least 15:1, or at least 20:1, or at least 25:1, or at least 30:1, or at least 40:1. As described above, these ratios correspond to $SiO_2$ to $TiO_2$ ratios ranging from at least 7.5:1 to at least 20:1. This results in crystalline support materials that contain from about 3 wt. % to about 6 wt. % of Ti. In still other embodiments, the crystalline support materials used in the invention are formed from a synthesis mixture having a $SiO_2$ to $(ZrO_2)_2$ ratio of 200:1 or less, or 150:1 or less, or 120:1 or less, or 100:1 or less, or 90:1 or less, or 80:1 or less, or 60:1 or less, or 50:1 or less, or 30:1 or less. As described above, these ratios correspond to $SiO_2$ to $ZrO_2$ ratios ranging from 100:1 or less down to 15:1 or less. In yet other embodiments, the support materials are formed from synthesis mixtures having a $SiO_2$ to $ZrO_2$ ratio of at least 15:1, or at least 20:1, or at least 25:1, or at least 30:1, or at least 40:1. As described above, these ratios correspond to $SiO_2$ to $ZrO_2$ ratios ranging from at least 7.5:1 to at least 20:1. This results in crystalline support materials that contain from about 3 wt. % to about 6 wt. % of Zr. The synthesis mixture for forming the support material may also contain small amounts of alumina, resulting in a silica to alumina ratio in the synthesis mixture of at least 250:1, or at least 500:1, or at least 700:1, or at least 800:1.

In the description below, various preferred embodiments involving MCM-41 support materials are described. MCM-41 support materials (or catalysts containing such support materials) that are composed substantially of $SiO_2$ will be referred to as Si-MCM-41. For example, a crystalline support formed from a synthesis mixture that does not contain $TiO_2$ or $ZrO_2$, and that has a $SiO_2:Al_2O_3$ ratio of greater than 200:1, will be referred to as Si-MCM-41. Crystalline support materials formed from a synthesis mixture with an $SiO_2:Al_2O_3$ ratio of 200:1 or less will be referred to as Al-MCM-41. Crystalline support materials formed from a synthesis mixture with an $SiO_2:(TiO_2)_2$ ratio of 200:1 or less will be referred to as Ti-containing MCM-41 materials. Crystalline support materials formed from a synthesis mixture with an $SiO_2:(ZrO_2)_2$ ratio of 200:1 or less will be referred to as Zr-containing MCM-41 materials. Note that both Ti-containing MCM-41 materials and Zr-containing MCM-41 materials may also include small amounts of alumina, with an $SiO_2:Al_2O_2$ ratio of 600:1-800:1, or possibly higher.

In various embodiments, the support materials are crystalline (i.e., having sufficient order to provide a diffraction pattern such as, for example, by X-ray, electron or neutron diffraction, following calcination with at least one peak) mesoporous support materials characterized by their structure, which includes extremely large pore windows as well as by its high sorption capacity. The term "mesoporous", as used herein, is meant to indicate crystals having uniform pores within the range of from about 13 Å to about 200 Å. It should be noted that "porous", as used herein, is meant to refer to a material that adsorbs at least 1 gram of a small molecule, such as Ar, $N_2$, n-hexane or cyclohexane, per 100 grams of the porous material. In the description below, pore size values have been determined by Ar-sorption data. As stated above, the present invention is characterized as using a support material having an average pore diameter of about 15 to less than about 40 Å, preferably about 15 to about 35 Å, and more preferably about 20 to about 30 Å, based on Ar sorption data. In another embodiment, the average pore diameter is at least about 15 Å, or at least about 20 Å. In yet another embodiment, the average pore diameter is about 40 Å or less, or about 35 Å or less, or about 30 Å or less.

In the description below, materials with an average pore diameter of about 15-30 Å will be referred to as small pore materials. Materials with an average pore diameter of about 35-50 Å will be referred to as medium pore materials. Materials with an average pore diameter greater than 60 Å will be referred to as large pore materials. The pore size of a material can be controlled in part by selecting a longer or shorter carbon chain for the surfactant used in the synthesis mixture for the material.

The support materials suitable for use herein can be distinguished from other porous inorganic solids by the regularity of the large open pores in the support material. The pore size of the large open pores in the inventive support material more nearly resemble the pore size of amorphous or paracrystalline materials, but the regular arrangement and uniformity of size (pore size distribution within a single phase of, for example, ±25%, usually ±15% or less of the average pore size of that phase) resemble more those of crystalline framework materials such as zeolites. Support materials for use herein can also be described as having a hexagonal arrangement of large open channels that can be synthesized with open internal diameters, based on Ar-sorption data, from about 15 to less than about 40 Å, preferably about 15 to about 35 Å, more preferably about 20 to about 30 Å.

The term "hexagonal", as used herein, is intended to encompass not only materials that exhibit mathematically perfect hexagonal symmetry within the limits of experimental measurement, but also those with significant observable deviations from that ideal state. Thus, "hexagonal" as used to describe the support materials suitable for use herein is meant to refer to the fact that most channels in the material would be surrounded by six nearest neighbor channels at roughly the same distance. It should be noted, however, that defects and imperfections in the support material will cause significant numbers of channels to violate this criterion to varying degrees, depending on the quality of the material's preparation. Samples which exhibit as much as ±25% random deviation from the average repeat distance between adjacent channels still clearly give recognizable images of the crystalline materials. Comparable variations are also observed in the $d_{100}$ values from the electron diffraction patterns.

The support materials suitable for use herein can be prepared by any means known in the art. Generally, the most regular preparations of the support material give an X-ray diffraction pattern with a few distinct maxima in the extreme low angle region. The positions of these peaks approximately fit the positions of the hkO reflections from a hexagonal lattice. The X-ray diffraction pattern, however, is not always a sufficient indicator of the presence of these materials, as the degree of regularity in the microstructure and the extent of repetition of the structure within individual particles affect the number of peaks that will be observed. Indeed, preparations with only one distinct peak in the low angle region of the X-ray diffraction pattern have been found to contain substantial amounts of the material in them. Other techniques to illustrate the microstructure of this material are transmission electron microscopy and electron diffraction. Properly oriented specimens of suitable support materials show a hexagonal arrangement of large channels and the corresponding electron diffraction pattern gives an approximately hexagonal arrangement of diffraction maxima. The $d_{100}$ spacing of the electron diffraction patterns is the distance between adjacent spots on the hkO projection of the hexagonal lattice and is related to the repeat distance $a_0$ between channels observed in the electron micrographs through the formula $d_{100}=a_0\sqrt{3}/2$. This $d_{100}$ spacing observed in the electron diffraction patterns corresponds to the d-spacing of a low angle peak in the X-ray diffraction pattern of the suitable support material. The most highly ordered preparations of the suitable support material obtained so far have 20-40 distinct spots observable in the electron diffraction patterns. These patterns can be indexed with the hexagonal hkO subset of unique reflections of 100, 110, 200, 210, etc., and their symmetry-related reflections.

In its calcined form, support materials suitable for use herein may also be characterized by an X-ray diffraction pattern with at least one peak at a position greater than about 18 Å d-spacing (4.909° 2θ for Cu K-alpha radiation) which corresponds to the $d_{100}$ value of the electron diffraction pattern of the support material. Also, suitable support materials display an equilibrium benzene adsorption capacity of greater than about 15 grams benzene/100 grams crystal at 50 torr (6.67 kPa) and 25° C. (Basis: crystal material having been treated in an attempt to insure no pore blockage by incidental contaminants, if necessary.)

It should be noted that the equilibrium benzene adsorption capacity characteristic of suitable support materials is measured on the basis of no pore blockage by incidental contaminants. For example, the sorption test will be conducted on the crystalline material phase having no pore blockage contaminants and water removed by ordinary methods. Water may be removed by dehydration techniques, e.g., thermal treatment. Pore blocking inorganic amorphous materials, e.g., silica, and organics may be removed by contact with acid or base or other chemical agents such that the detrital material will be removed without detrimental effect on the crystal.

In a preferred embodiment, the calcined, crystalline, non-layered support materials suitable for use herein can be characterized by an X-ray diffraction pattern with at least two peaks at positions greater than about 10 Å d-spacing (8.842° 2θ for Cu K-alpha radiation) which corresponds to the $d_{100}$ value of the electron diffraction pattern of the support material, at least one of which is at a position greater than about 18 Å d-spacing, and no peaks at positions less than about 10 Å d-spacing with relative intensity greater than about 20% of the strongest peak. Still most preferred, the X-ray diffraction pattern of the calcined material of this invention will have no peaks at positions less than about 10 Å d-spacing with relative intensity greater than about 10% of the strongest peak. In any event, at least one peak in the X-ray diffraction pattern will have a d-spacing that corresponds to the $d_{100}$ value of the electron diffraction pattern of the material.

The calcined, inorganic, non-layered, crystalline support materials suitable for use herein can also be characterized as having a pore size of about 13 Å or greater as measured by physisorption measurements. It should be noted that pore size, as used herein, is to be considered a maximum perpendicular cross-section pore dimension of the crystal.

X-ray diffraction data were collected on a Scintag PAD X automated diffraction system employing theta-theta geometry, Cu K-alpha radiation, and an energy dispersive X-ray detector. Use of the energy dispersive X-ray detector eliminated the need for incident or diffracted beam monochromators. Both the incident and diffracted X-ray beams were collimated by double slit incident and diffracted collimation systems. The slit sizes used, starting from the X-ray tube source, were 0.5, 1.0, 0.3 and 0.2 mm, respectively. Different slit systems may produce differing intensities for the peaks. The materials of the present invention that have the largest pore sizes may require more highly collimated incident X-ray beams in order to resolve the low angle peak from the transmitted incident X-ray beam.

The diffraction data were recorded by step-scanning at 0.04 degrees of 2θ, where θ is the Bragg angle, and a counting time of 10 seconds for each step. The interplanar spacings, d's, were calculated in angstroms (Å), and the relative intensities of the lines, $I/I_o$, where $I_o$ is one-hundredth of the intensity of the strongest line, above background, were derived with the use of a profile fitting routine. The intensities were uncorrected for Lorentz and polarization effects. The relative intensities are given in terms of the symbols vs=very strong (75-100), s=strong (50-74), m=medium (25-49) and w=weak (0-24). The diffraction data listed as single lines may consist of multiple overlapping lines which under certain conditions, such as very high experimental resolution or crystallographic changes, may appear as resolved or partially resolved lines. Typically, crystallographic changes can include minor changes in unit cell parameters and/or a change in crystal symmetry, without a substantial change in structure. These minor effects, including changes in relative intensities, can also occur as a result of differences in cation content, framework composition, nature and degree of pore filling, thermal and/or hydrothermal history, and peak width/shape variations due to particle size/shape effects, structural disorder or other factors known to those skilled in the art of X-ray diffraction.

The equilibrium benzene adsorption capacity is determined by contacting the material of the invention, after dehydration or calcination at, for example, about 540° C. for at least about one hour and other treatment, if necessary, in an attempt to remove any pore blocking contaminants, at 25° C. and 50 torr benzene until equilibrium is reached. The weight of benzene sorbed is then determined as described below.

The ammonium form of the catalytic material may be readily converted to the hydrogen form by thermal treatment (calcination). This thermal treatment is generally performed by heating one of these forms at a temperature of at least 400° C. for at least 1 minute and generally not longer than 20 hours, preferably from about 1 to about 10 hours. While subatmospheric pressure can be employed for the thermal treatment, atmospheric pressure is desired for reasons of convenience, such as in air, nitrogen, ammonia, etc. The thermal treatment can be performed at a temperature up to about 750° C. The thermally treated product is particularly useful in the catalysis of certain hydrocarbon conversion reactions and it is preferred that the material should be in this from for use in the present catalysts.

The support materials suitable for use herein can be shaped into a wide variety of particle sizes. Generally speaking, the support material particles can be in the form of a powder, a granule, or a molded product, such as an extrudate having particle size sufficient to pass through a 2 mesh (Tyler) screen and be retained on a 400 mesh (Tyler) screen. In cases where the final catalyst is to be molded, such as by extrusion, the support material particles can be extruded before drying or partially dried and then extruded.

The size of the pores in the present support materials are controlled such that they are large enough that the spatiospecific selectivity with respect to transition state species in reactions such as cracking is minimized (Chen et al., "Shape Selective Catalysis in Industrial Applications", 36 CHEMICAL INDUSTRIES, pgs. 41-61 (1989), to which reference is made for a discussion of the factors affecting shape selectivity). It should also be noted that diffusional limitations are also minimized as a result of the very large pores.

Support materials suitable for use herein can be self-bound, i.e., binderless. However, it is preferred that the present invention also comprises a suitable binder material. This binder material is selected from any binder material known that is resistant to temperatures and other conditions employed in the present hydrogenation process. The support materials are composited with the binder material to form a finished catalyst onto which metals can be added. Binder materials suitable for use herein include active and inactive materials as well as inorganic materials such as clays and/or oxides such as alumina, silica or silica-alumina. Still other oxides such as titania or zirconia may also be used. Mixtures of binders may also be used, such as a mixture of a silica binder and an alumina binder (as opposed to a binder composed of silica-alumina particles). Silica-alumina, alumina, titania, and zirconia are preferred binder materials, and alumina is a more preferred binder support material. Silica-alumina may be either naturally occurring or in the form of gelatinous precipitates or gels including mixtures of silica and metal oxides. It should be noted that the use of a material in conjunction with a zeolite binder material, i.e., combined therewith or present during its synthesis, which itself is catalytically active may change the conversion and/or selectivity of the finished catalyst. Likewise, inactive materials can suitably serve as diluents to control the amount of conversion if the present invention is employed in alkylation processes so that alkylation products can be obtained economically and orderly without employing other means for controlling the rate of reaction. These inactive materials may be incorporated into naturally occurring clays, e.g., bentonite and kaolin, to improve the crush strength of the catalyst under commercial operating conditions and function as binders or matrices for the catalyst.

Hydrogenation catalysts suitable for use herein typically comprise, in a composited form, a ratio of mesoporous support material to binder material ranging from a binderless support material (100 parts support material with 0 parts binder material) to 20 parts support material to 80 parts binder material. All ratios are expressed by weight. In an embodiment, the ratio of support material to binder material is from about 80:20 to about 50:50. In another preferred embodiment, the ratio of support material to binder material is from about 65:35 to about 35:65. Compositing may be done by conventional means including mulling the materials together followed by extrusion of pelletizing into the desired finished catalyst particles.

In a preferred embodiment, hydrogenation catalysts suitable for use herein also comprise at least one hydrogenation-dehydrogenation component selected from the Group VIII noble metals. It is preferred that the hydrogenation-dehydrogenation component be selected from palladium, platinum, rhodium, iridium, and mixtures thereof, more preferably platinum, palladium, and mixtures thereof. It is most preferred that the present invention hydrogenation-dehydrogenation component be platinum and palladium.

The hydrogenation-dehydrogenation component is typically present in an amount ranging from about 0.1 to about 2.0 wt. %, preferably from about 0.2 to about 1.8 wt. %, more preferably 0.3 to about 1.6 wt. %, and most preferably 0.4 to about 1.4 wt. %. All metals weight percents are on support. By "on support" we mean that the percents are based on the weight of the support, i.e., the composited support material and binder material. For example, if the support were to weigh 100 grams then 20 wt. % hydrogenation-dehydrogenation component would mean that 20 grams of the hydrogenation-dehydrogenation metal was on the support.

The hydrogenation-dehydrogenation component can be exchanged onto the support material, impregnated into it or physically admixed with it. It is preferred that the hydrogenation/dehydrogenation component be incorporated by impregnation. If the hydrogenation-dehydrogenation component is to be impregnated into or exchanged onto the composited support material and binder, it may be done, for example, by treating the composite with a suitable ion containing the hydrogenation-dehydrogenation component. If the hydrogenation-dehydrogenation component is platinum, suitable platinum compounds include chloroplatinic acid, platinous chloride and various compounds containing the platinum amine complex. The hydrogenation-dehydrogenation component may also be incorporated into, onto, or with the composited support and binder material by utilizing a compound (s) wherein the hydrogenation-dehydrogenation component is present in the cation of the compound and/or compounds or in which it is present in the anion of the compound(s). It should be noted that both cationic and anionic compounds can be used. Non-limiting examples of suitable palladium or platinum compounds in which the metal is in the form of a cation or cationic complex are $Pd(NH_3)_4Cl_2$ or $Pt(NH_3)_4Cl_2$ are particularly useful, as are anionic complexes such as the vanadate and metatungstate ions. Cationic forms of other metals are also very useful since they may be exchanged onto the crystalline material or impregnated into it.

The hydrogenation catalyst of the invention is suitable for treatment of hydrocarbon feedstocks in the presence of a hydrogen-containing treat gas in a reaction stage operated under effective hydrogenation conditions. The reaction stage can be comprised of one or more reactors or reaction zones each of which can comprise one or more catalyst beds of the same or different hydrogenation catalyst described above. Although other types of catalyst beds can be used, fixed beds are preferred. Such other types of catalyst beds include fluidized beds, ebullating beds, slurry beds, and moving beds. Interstage cooling or heating between reactors, reaction zones, or between catalyst beds in the same reactor, can be employed. A portion of any heat generated during the hydrogenation process can also be recovered. Where this heat recovery option is not available, conventional cooling may be performed through cooling utilities such as cooling water or air, or through use of a hydrogen quench stream. In this manner, optimum reaction temperatures can be more easily maintained.

Hydrogen-containing treat gasses suitable for use in a hydrogenation process can be comprised of substantially pure hydrogen or can be mixtures of other components typically found in refinery hydrogen streams. It is preferred that the hydrogen-containing treat gas stream contains little, more preferably no, hydrogen sulfide. The hydrogen-containing treat gas purity should be at least about 50% by volume hydrogen, preferably at least about 75% by volume hydrogen, and more preferably at least about 90% by volume hydrogen for best results. It is most preferred that the hydrogen-containing stream be substantially pure hydrogen.

The hydrocarbon feedstream is contacted with the hydrogenation catalyst under effective hydrogenation conditions. In an embodiment, effective hydrogenation conditions are to be considered those conditions under which at least a portion of the aromatics present in the hydrocarbon feedstream are saturated, preferably at least about 50 wt. % of the aromatics are saturated, more preferably greater than about 75 wt. %. Effective hydrogenation conditions include temperatures of from 150° C. to 400° C., a hydrogen partial pressure of from 740 to 20786 kPa (100 to 3000 psig), a space velocity of from 0.1 to 10 liquid hourly space velocity (LHSV), and a hydrogen to feed ratio of from 89 to 1780 m$^3$/m$^3$ (500 to 10000 scf/B).

In one embodiment of the instant invention, the effective hydrogenation conditions are conditions effective at removing at least a portion of the nitrogen and organically bound sulfur contaminants and hydrogenating at least a portion of said aromatics, thus producing at least a liquid diesel boiling range product having a lower concentration of aromatics and nitrogen and organically bound sulfur contaminants than the diesel boiling range feedstream.

As stated above, in some instances, the hydrocarbon feedstream is hydrotreated to reduce the sulfur contaminants to below about 500 wppm, preferably below about 300 wppm, more preferably below about 200 wppm. In such an embodiment, the process comprises at least two reaction stages, the first containing a hydrotreating catalyst operated under effective hydrotreating conditions, and the second containing a hydrogenation catalyst has described above operated under effective hydrogenation conditions as described above. Therefore, in such an embodiment, the hydrocarbon feedstream is first contacted with a hydrotreating catalyst in the presence of a hydrogen-containing treat gas in a first reaction stage operated under effective hydrotreating conditions in order to reduce the sulfur content of the lube oil boiling range feedstream to within the above-described range. Thus, the term "hydrotreating" as used herein refers to processes wherein a hydrogen-containing treat gas is used in the presence of a suitable catalyst that is active for the removal of heteroatoms, such as sulfur, and nitrogen. Suitable hydrotreating catalysts for use in the present invention are any conventional hydrotreating catalyst and includes those which are comprised of at least one Group VIII metal, preferably Fe, Co and Ni, more preferably Co and/or Ni, and most preferably Co; and at least one Group VI metal, preferably Mo and W, more preferably Mo, on a high surface area support material, preferably alumina. It is within the scope of the present invention that more than one type of hydrotreating catalyst be used in the same reaction vessel. The Group VIII metal is typically present in an amount ranging from about 2 to 20 wt. %, preferably from about 4 to 12%. The Group VI metal will typically be present in an amount ranging from about 5 to 50 wt. %, preferably from about 10 to 40 wt. %, and more preferably from about 20 to 30 wt. %. All metals weight percents are on support. By "on support" we mean that the percents are based on the weight of the support. For example, if the support were to weigh 100 grams then 20 wt. % Group VIII metal would mean that 20 grams of Group VIII metal was on the support.

Effective hydrotreating conditions are to be considered those conditions that can effectively reduce the sulfur content of the lube oil boiling range feedstream to within the above-described ranges. Typical effective hydrotreating conditions include temperatures ranging from about 150° C. to about 425° C., preferably about 200° C. to about 370° C., more preferably about 230° C. to about 350° C. Typical weight hourly space velocities ("WHSV") range from about 0.1 to about 20 hr$^{-1}$, preferably from about 0.5 to about 5 hr$^{-1}$. Any effective pressure can be utilized, and pressures typically range from about 4 to about 70 atmospheres (405 to 7093 kPa), preferably 10 to 40 atmospheres (1013 to 4053 kPa). In a preferred embodiment, said effective hydrotreating conditions are conditions effective at removing at least a portion of said organically bound sulfur contaminants and hydrogenating at least a portion of said aromatics, thus producing at least a liquid lube oil boiling range product having a lower concentration of aromatics and organically bound sulfur contaminants than the lube oil boiling range feedstream.

The contacting of the hydrocarbon feedstream with the hydrotreating catalyst produces a reaction product comprising at least a vapor product and a liquid product. The vapor product typically comprises gaseous reaction products such as $H_2S$, and the liquid reaction product typically comprises a liquid hydrocarbon having a reduced level of nitrogen and sulfur contaminants. The total reaction product can be passed directly into the second reaction stage, but it is preferred that the gaseous and liquid reaction products be separated, and the liquid reaction product conducted to the second reaction stage. Thus, in one embodiment of the present invention, the vapor product and the liquid product are separated, and the liquid product conducted to the second reaction stage. The method of separating the vapor product from the liquid product can be accomplished by any means known to be effective at separating gaseous and liquid reaction products. For example, a stripping tower or reaction zone can be used to separate the vapor product from the liquid lube oil boiling range product. The liquid product thus conducted to the second reaction stage will have a sulfur concentration within the range of about 500 wppm, preferably below about 300 wppm, more preferably below about 200 wppm.

In still other embodiments, the catalysts according to the invention can be used in integrated hydroprocessing methods. In addition to the hydrofinishing and/or aromatic saturation processes involving the inventive catalyst, an integrated hydroprocessing method can also include various combinations of hydrotreating, hydrocracking, catalytic dewaxing (such as hydrodewaxing), and/or solvent dewaxing. The scheme of hydrotreating followed by hydrofinishing described about represents one type of integrated process flow. Another integrated processing example is to have a dewaxing step, either catalytic dewaxing or solvent dewaxing, followed by hydroprocessing with the inventive catalyst. Still another example is a process scheme involving hydrotreating, dewaxing (catalytic or solvent), and then hydroprocessing with the inventive catalyst. Yet another example is hydroprocessing with the inventive catalyst followed by dewaxing (catalytic or solvent). Alternatively, multiple hydrofinishing and/or aromatic saturation steps could be employed with hydrotreatment, hydrocracking, or dewaxing steps. An example of such a process flow is hydrofinishing, dewaxing (catalytic or solvent), and then hydrofinishing again, where at least one of the hydrofinishing steps is a catalyst according to the invention. For processes involving catalytic dewaxing, effective catalytic dewaxing conditions include temperatures of from 250° C. to 400° C., preferably 275° C. to 350° C., pressures of from 791 to 20786 kPa (100 to 3000 psig), preferably 1480 to 17338 kPa (200 to 2500 psig), liquid hourly space velocities of from 0.1 to 10 hr$^{-1}$, preferably 0.1 to 5 hr$^{-1}$ and hydrogen treat gas rates from 45 to 1780 m$^3$/m$^3$ (250 to 10000 scf/B), preferably 89 to 890 m$^3$/m$^3$ (500 to 5000 scf/B). Any suitable dewaxing catalyst may be used.

The above description is directed to several embodiments of the present invention. Those skilled in the art will recognize that other embodiments that are equally effective could be devised for carrying out the spirit of this invention.

The following examples provide embodiments of the invention that illustrate the improved effectiveness of the inventive hydrogenation catalyst and corresponding hydrogenation processes.

EXAMPLES

Example 1

Preparation of Small Pore Ti-MCM-41 with $SiO_2/(TiO_2)_2$~50/1

A mixture was prepared from 620 g of water, 250 g of Tetraethylammonium Hydroxide (TEAOH) 35% solution, 370 g of ARQUAD 12/37 solution (a C12 surfactant, available from Akzo-Nobel), 38.4 g of Titanium Ethoxide in 40 g of Ethanol solution, and 170 g of Ultrasil. The mixture had the following molar composition:

| | |
|---|---|
| $SiO_2/(TiO_2)_2$ | ~50/1 |
| $H_2O/SiO_2$ | ~22 |
| TEAOH/Surfactant | ~1 |
| $SiO_2$/Surfactant | ~6 |

The mixture was reacted at 265° F. (129.5° C.) in a 2-liter autoclave with stirring at 90 RPM for 36 hours. The product was filtered, washed with deionized (DI) water, followed by drying at 250° F. (120° C.) and calcination at 1000° F. (540° C.) for 6 hrs. FIG. 1 shows the XRD pattern of the as-synthesized material. FIG. 1 shows a typical signature for a pure phase of small pore (<30 Å) MCM-41 topology. An SEM of the as-synthesized material showed that the material was composed of agglomerates of small crystals. The resulting Ti-MCM-41 crystals contained ~4.35 wt % of Ti and surface area of 1276 $m^2/g$.

Example 2

Preparation of Small Pore Ti-MCM-41 with $SiO_2/(TiO_2)_2$~50/1

A mixture was prepared from 620 g of water, 250 g of Tetraethylammonium Hydroxide (TEAOH) 35% solution, 370 g of ARQUAD 12/37 solution, 38.4 g of Titanium Ethoxide in 40 g of Ethanol solution, and 170 g of Ultrasil. The mixture had the following molar composition:

| | |
|---|---|
| $SiO_2/(TiO_2)_2$ | ~50/1 |
| $H_2O/SiO_2$ | ~22 |
| TEAOH/Surfactant | ~1 |
| $SiO_2$/Surfactant | ~6 |

Figure 2:
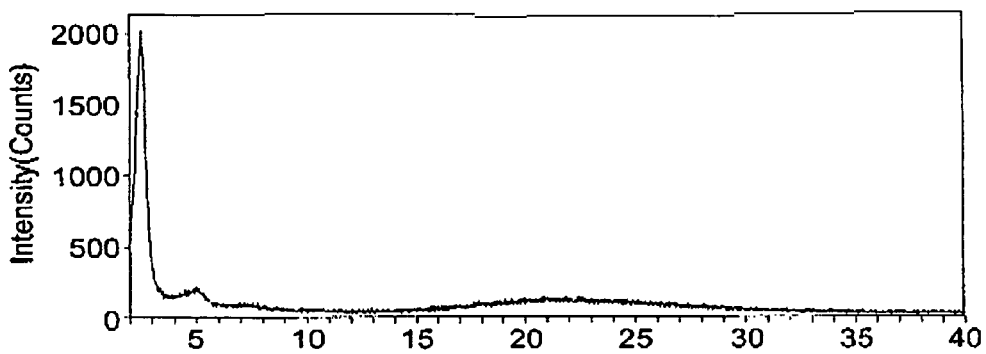

The mixture was reacted at 212° F. (100° C.) in a 2-liter autoclave with stirring at 90 RPM for 48 hours. The product was filtered, washed with deionized (DI) water, followed by drying at 250° F. (120° C.) and calcination at 1000° F. (540° C.) for 6 hrs. FIG. 2 shows the XRD pattern of the as-synthesized material, which displays typical signature for a pure phase small pore (<30 Å) MCM-41 topology. The SEM of the as-synthesized material showed that the material was composed of agglomerates of small crystals. The resulting Ti-MCM-41 crystals contained ~4.3 wt % of Ti and surface area of 1170 $m^2/g$.

Example 3

Preparation of Small Pore Ti-MCM-41 with $SiO_2/(TiO_2)_2$~50/1

A mixture was prepared from 805 g of water, 250 g of Tetraethylammonium Hydroxide (TEAOH) 35% solution, 185 g of ARQUAD 12/37 solution, 61 g of n-Decylmethylammonium Bromide, 38.4 g of Titanium Ethoxide in 40 g of Ethanol solution, and 170 g of Ultrasil. The mixture had the following molar composition:

| | |
|---|---|
| $SiO_2/(TiO_2)_2$ | ~50/1 |
| $H_2O/SiO_2$ | ~22 |
| TEAOH/Surfactant | ~1 |
| $SiO_2$/Surfactant | ~6 |

Figure 3:
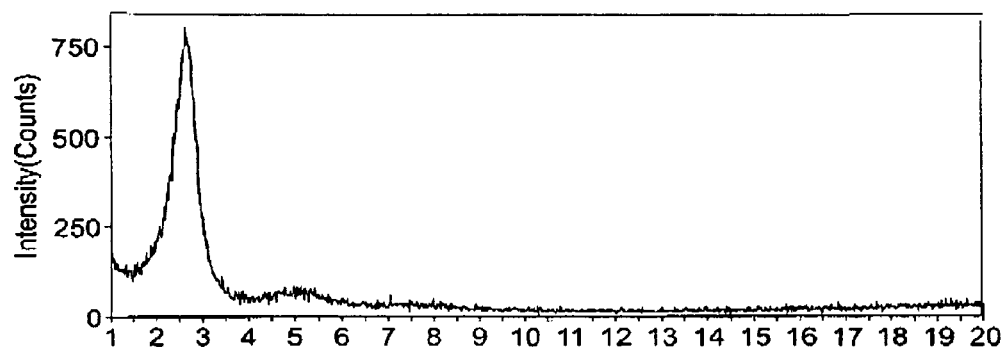

The mixture was reacted at 212° F. (100° C.) in a 2-liter autoclave with stirring at 90 RPM for 36 hours. The product was filtered, washed with deionized (DI) water, followed by drying at 250° F. (120° C.) and calcination at 1000° F. (540° C.) for 6 hrs. FIG. 3 shows the XRD pattern of the as-synthesized material, which shows a typical signature for a pure phase of small pore (<30 Å) MCM-41 topology. The SEM of the as-synthesized material showed that the material was composed of agglomerates of small crystals. The resulting Ti-MCM-41 crystals contained 4.62 wt % of Ti and surface area of 1186 $m^2/g$.

Example 4

Preparation of Large Pore Ti-MCM-41 with $SiO_2/(TiO_2)_2$~60/1

A mixture was prepared from 737 g of water, 56.1 g of NaOH 50% solution, 305.8 g of ARQUAD 16/29 solution (C16 surfactant), 198.1 g of Mesitylene of 99% solution, 31.5 g of Titanium Ethoxide in 30 g of Ethanol solution, and 181.5 g of Ultrasil. The mixture had the following molar composition:

| | |
|---|---|
| $SiO_2/(TiO_2)_2$ | ~60/1 |
| $H_2O/SiO_2$ | ~20 |
| Na/Surfactant | ~0.252 |
| $SiO_2$/Surfactant | ~10 |
| Mesitylene/surfactant | ~6 |

Figure 4:
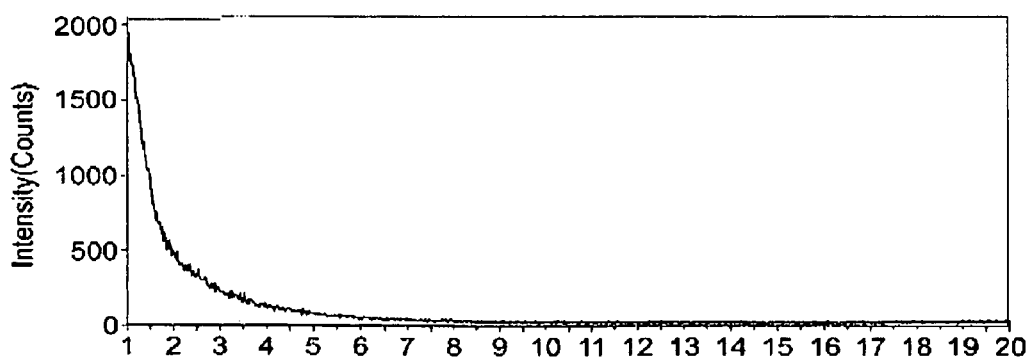

The mixture was reacted at 240° F. (115.5° C.) in a 2-liter autoclave with stirring at 250 RPM for 24 hours. The product was filtered, washed with deionized (DI) water, followed by drying at 250° F. (120° C.) and calcination at 1000° F. (540° C.) for 6 hrs. FIG. 4 shows the XRD pattern of the as-synthesized material, which shows the typical pure phase of large pore, >60 Å, MCM-41 topology. The SEM of the as-synthesized material shows that the material was composed of agglomerates of small crystals. The resulting Ti-MCM-41 crystals contained 2.61 wt % of Ti and surface area of 771 $m^2/g$.

Example 5

Preparation of Small Pore Zr-MCM-41 with $SiO_2/(ZrO_2)_2$~50/1

A mixture was prepared from 620 g of water, 250 g of Tetraethylammonium Hydroxide (TEAOH) 35% solution, 370 g of ARQUAD 12/37 solution, 14 g of Zirconyl Chloride·8 H2O in 40 g of water, and 170 g of Ultrasil. The mixture had the following molar composition:

| | |
|---|---|
| $SiO_2/(ZrO_2)_2$ | ~50/1 |
| $H_2O/SiO_2$ | ~22 |
| TEAOH/Surfactant | ~1 |
| $SiO_2$/Surfactant | ~6 |

The mixture was reacted at 265° F. (129.5° C.) in a 2-liter autoclave with stirring at 90 RPM for 36 hours. The product was filtered, washed with deionized (DI) water, followed by drying at 250° F. (120° C.) and calcination at 1000° F. (540° C.) for 6 hrs. The XRD pattern of the as-synthesized material showed the typical pure phase of small pore, <30 Å, MCM-41 topology. The SEM of the as-synthesized material shows that the material was composed of agglomerates of small crystals. The resulting Zr-containing MCM-41 crystals contained ~2.36 wt % of Zr and surface area of 1138 $m^2/g$ after the calcinations at 540° C. in air.

Example 6

Comparison of Ti-Containing and Zr-Containing MCM-41 Materials with Al-MCM-41 and Si-MCM-41

A series of catalysts were made using Si-MCM-41 ($SiO_2$:$Al_2O_3$ ratio of between 600:1 and 800:1, medium pore diameter openings), two versions of Al-MCM-41 (50:1 $SiO_2$:$Al_2O_3$ with medium pore diameter openings, and 25:1 $SiO_2$:$Al_2O_3$ with small pore diameter openings), and Ti-MCM-41 (25:1 $SiO_2$:$(TiO_2)_2$ with small pore diameter openings). The small pore materials were prepared using a C12 surfactant, while the medium pore materials were prepared using a C16 surfactant. In the following examples, MCM-41 mesoporous materials were synthesized, washed, and prepared into a filter cake. The filter cake was dried and then precalcined in nitrogen at about 540° C. The precalcined MCM-41 materials were then mixed in a 65:35 weight ratio with an alumina binder and extruded into 1/16" cylinders. The extrudates were dried and then calcined in air at about 538° C. The calcined extrudates were then co-impregnated with 0.3 wt % platinum and 0.9 wt % palladium and dried at 120° C. The catalysts then received a final calcination in air at 304° C. to decompose the platinum and palladium compounds.

For comparison, an amorphous catalyst was made by extruding 80% alumina and 20% silica into 1/16" cylinders. The extrudates were dried and then calcined in air at about 538° C. The calcined extrudates were then co-impregnated with 0.3 wt % platinum and 0.9 wt % palladium and dried at 120° C. The catalysts then received a final calcination in air at 304° C. to decompose the platinum and palladium compounds.

Properties of the finished catalysts are summarized below. Note that metal dispersion, as measured by oxygen chemisorption, is similar for all the finished catalysts. The metal dispersion appears to be slightly higher for Ti-containing MCM-41 than the other versions of MCM-41 shown in the Table. The benzene hydrogenation activity index is high for all MCM-41 materials, with higher values observed for framework substituted MCM-41 materials. Note that both the benzene hydrogenation activity index and the $O_2$ chemisorption are normalized per unit amount of hydrogenation metal.

TABLE 1

| Description | Pt, wt % | Pd, wt % | Surface Area, m2/g | Benzene Hydrogenation Activity Index | $O_2$ Chemisorption, O/M |
|---|---|---|---|---|---|
| 65/35 Si-MCM-41 (>600:1 $SiO_2$:$Al_2O_3$ medium pore)/$Al_2O_3$ | 0.28 | 0.88 | 575 | 170 | 0.65 |
| 65/35 Al-MCM-41 (~50:1 $SiO_2$:$Al_2O_3$ medium pore)/$Al_2O_3$ | 0.27 | 0.89 | 490 | 190 | 0.64 |
| 65/35 Ti-containing MCM-41 (~40:1 $SiO_2$:$(TiO_2)_2$ small pore)/$Al_2O_3$ | 0.28 | 0.86 | 642 | 220 | 0.72 |
| 65/35 Zr-containing MCM-41 (~40:1 $SiO_2$:$(ZrO_2)_2$ small pore)/$Al_2O_3$ | 0.46 | 0.84 | 642 | 200 | 0.67 |
| 65/35 Al-MCM-41 (~25:1 $SiO_2$:$Al_2O_3$ small pore)/$Al_2O_3$ | 0.29 | 0.87 | 711 | 230 | 0.68 |
| 20/80 $SiO_2$:$Al_2O_3$ | 0.27 | 0.91 | 307 | 40 | 0.50 |

Following catalyst preparation, the performance of the Ti-containing MCM-41 was evaluated for hydrofinishing of a commercially available hydrocarbon fluid relative to the Si-MCM-41 and Al-MCM-41 samples and the amorphous silica-alumina sample. The hydrocarbon fluid when analyzed had a boiling range of about 520-640° F., <5 ppm sulfur and nitrogen, and about 1.8 wt % aromatics. Approximately 20 cc of each catalyst was loaded into an upflow micro-reactor. About 15 cc of 80-120 mesh sand was added to the catalyst to ensure uniform liquid flow. After pressure testing with nitrogen and hydrogen, the catalysts were dried in nitrogen at 260° C. for about 3 hours, cooled to room temperature, activated in hydrogen at about 260° C. for 8 hours and then cooled to 150° C. Then oil feed was introduced and operating conditions were adjusted to 1 LHSV, 350 psig, and 1,000 scf $H_2$/bbl. Reactor temperature was increased from 175 to 220° C. over a period of about 10 days. Hydrogen purity was 100% and no gas recycle was used.

Figure 5:
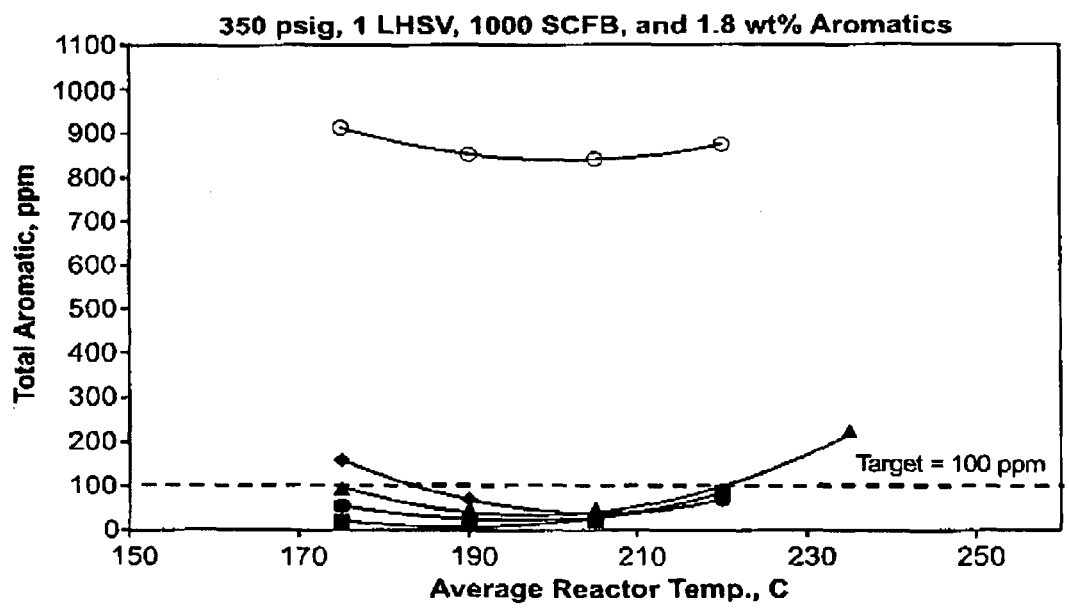
FIGS. 5 and 6 show results from aromatic saturation of a hydrocarbon feedstock by various catalysts.

Aromatics were measured by UV absorption (ppm) and were monitored daily. Total aromatics as a function of temperature are shown in FIG. 5 for the amorphous silica-alumina catalyst and catalysts made using the different MCM-41 materials. As shown in FIG. 5, all of the MCM-41 catalysts performed substantially better than an amorphous silica-alumina catalyst.

Figure 6:
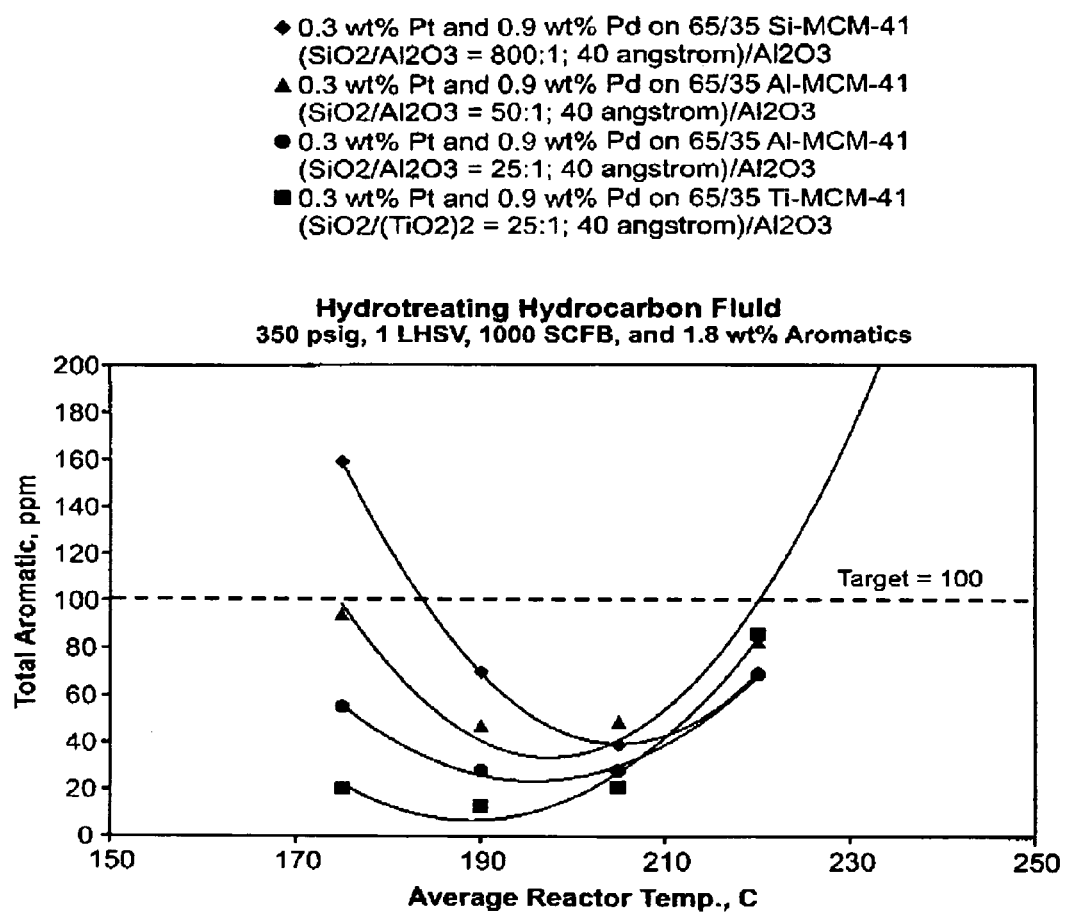

FIG. 6 provides an enlarged view of plot in FIG. 5 that focuses on just the MCM-41 catalysts. In FIG. 6, the Ti-containing MCM-41 catalyst at temperatures of about 190° C. or less shows a substantial reduction in the amount of aromatics remaining after the aromatic saturation process. The Ti-containing MCM-41 catalyst produces aromatic contents of 20 ppm or less, while the Al-MCM-41 catalysts tested produced aromatic contents of 30 ppm or more. The Ti-containing MCM-41 catalyst also achieves its highest percentage of aromatic saturation at a lower temperature than any of the other catalysts. The equilibrium processes involved in aromatic saturation tend to favor aromatic saturation as temperature decreases, so the ability to catalyst aromatic saturation at a lower temperature is desirable. Lower temperature processes are also preferred both for improving catalyst life and for reducing operating costs.

Example 7

Pore Size Effects

Figure 7:
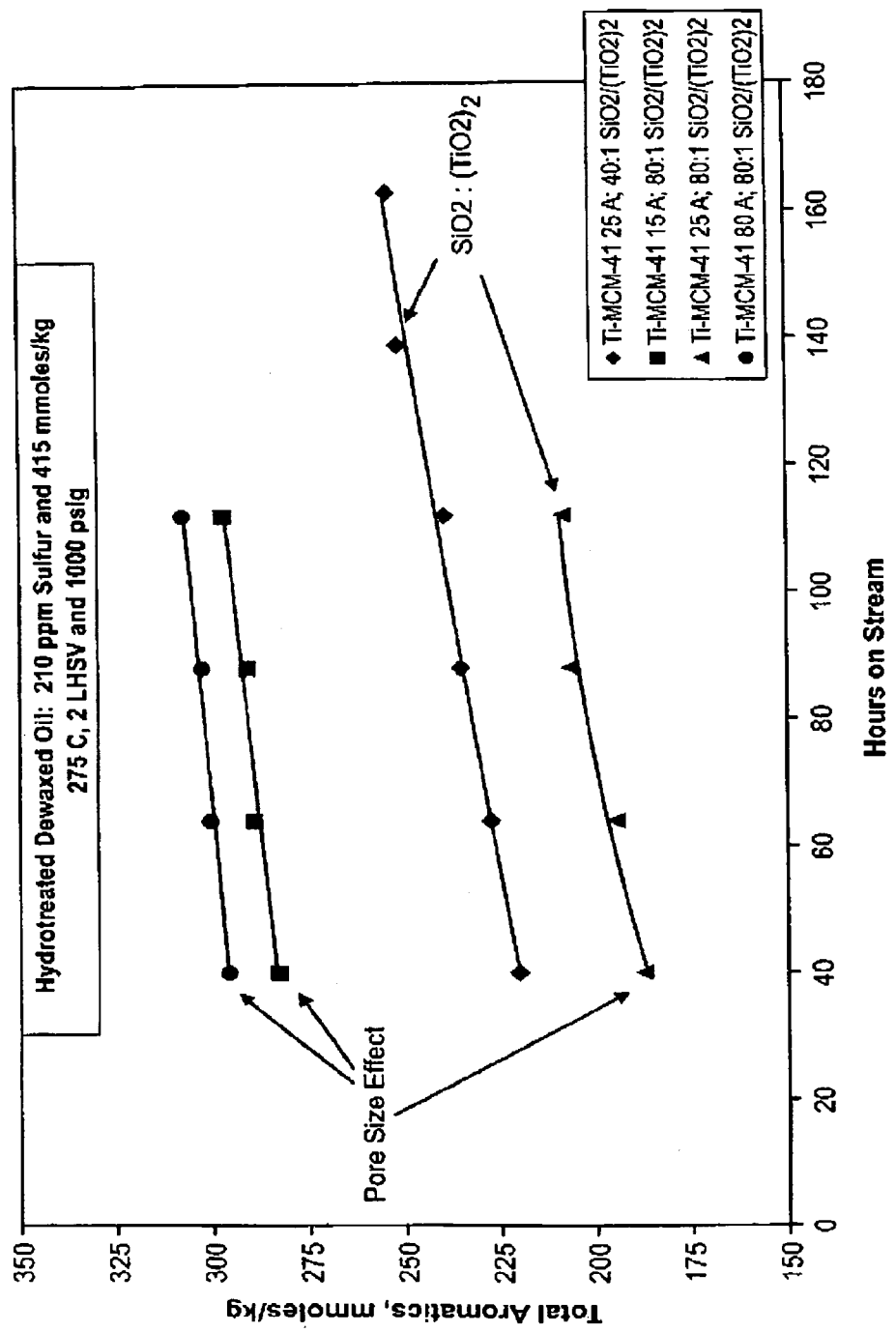
FIG. 7 depicts results from aromatic saturation of a hydrocarbon feedstock by various catalysts.

FIG. 7 shows the effect of varying pore size for a series of Ti-containing MCM-41 catalysts. In FIG. 7, an aromatics saturation process was performed on a dewaxed 600N lubricating oil feedstock containing 210 ppm sulfur and 415 mmoles/kg of aromatics. The dewaxed oil feedstock was processed at 275° C., 2 LHSV, and 1000 psig for the period of time shown in FIG. 7. The Ti-MCM-41 catalysts used had pore sizes of about 15 Å, about 25 Å, or about 80 Å. All three pore sizes were investigated for Ti-MCM-41 with an 80:1 $SiO_2$:$(TiO_2)_2$ ratio, and an additional test was performed for a catalyst with an about 25 Å pore size and a 40:1 ratio. As shown in FIG. 7, the Ti-MCM-41 catalysts with the about 25 Å pore size provided the best aromatic saturation, with the catalyst with the about 80 Å pore size performing slightly better than the catalyst with the about 15 Å pore size.

Example 8

Binder Effects

Figure 8:
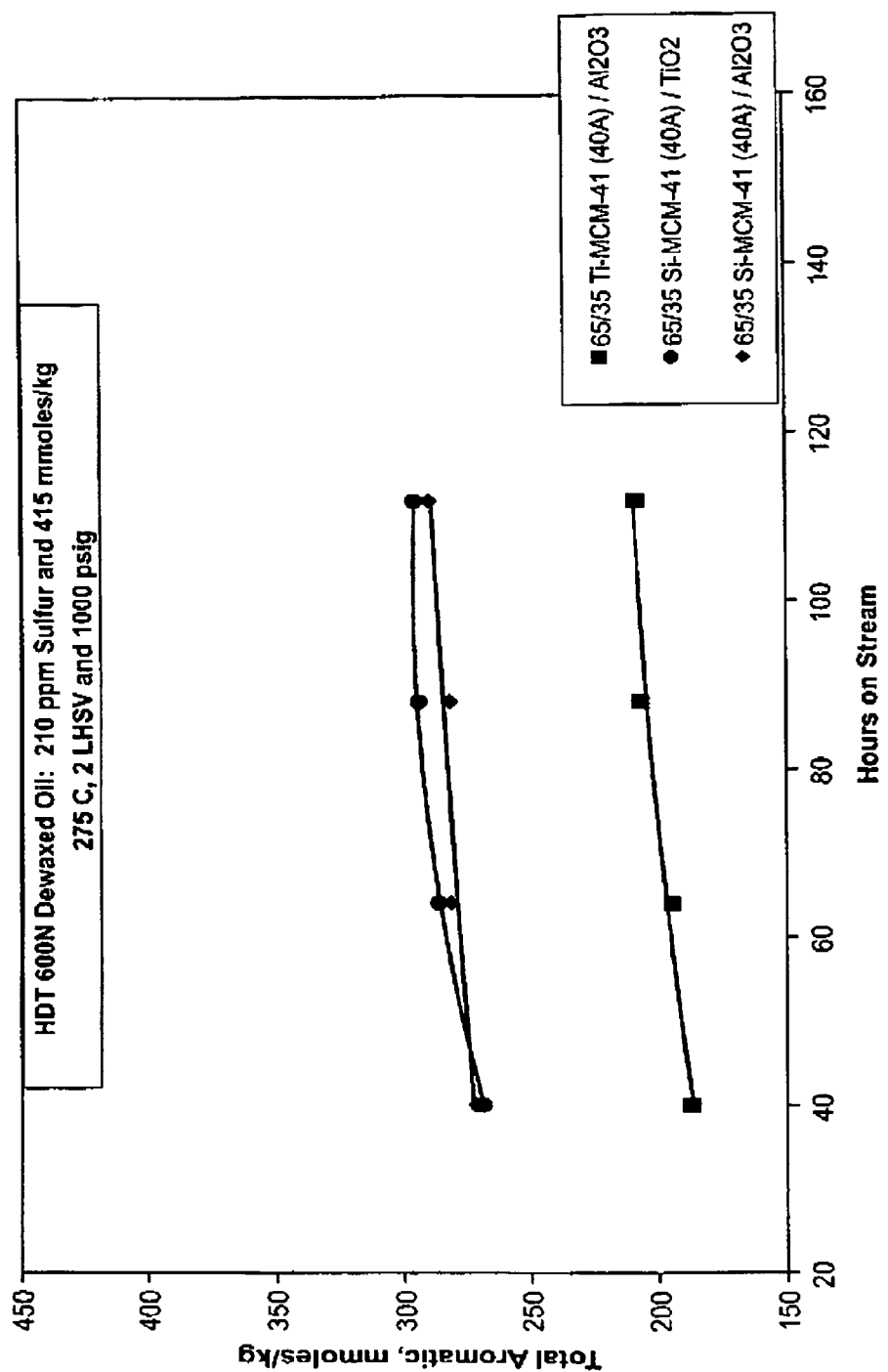
FIG. 8 depicts results from aromatic saturation of a hydrocarbon feedstock by various catalysts.

The activity improvement from adding Ti into the framework of an MCM-41 support cannot be achieved simply by using $TiO_2$ as the catalyst binder for an MCM-41 catalyst. FIG. 8 shows the aromatic saturation performance for a series of MCM-41 catalysts having a medium pore size. The catalysts include a Ti-containing MCM-41 catalyst bound with $Al_2O_3$, an Si-MCM-41 catalyst bound with $Al_2O_3$, and Si-MCM-41 catalyst bound with $TiO_2$. These catalysts were used for aromatic saturation of a feedstock, where the feedstock and process conditions were similar to those described in Example 7. As shown in FIG. 8, the Si-MCM-41 catalysts with alumina and titania binders exhibited similar aromatic saturation. By contrast, the Ti-containing MCM-41 catalyst according to the invention showed improved catalyst activity relative to the Si-MCM-41 catalysts.

Example 9

Activity for Zr-Containing MCM-41 Catalysts

Figure 9:
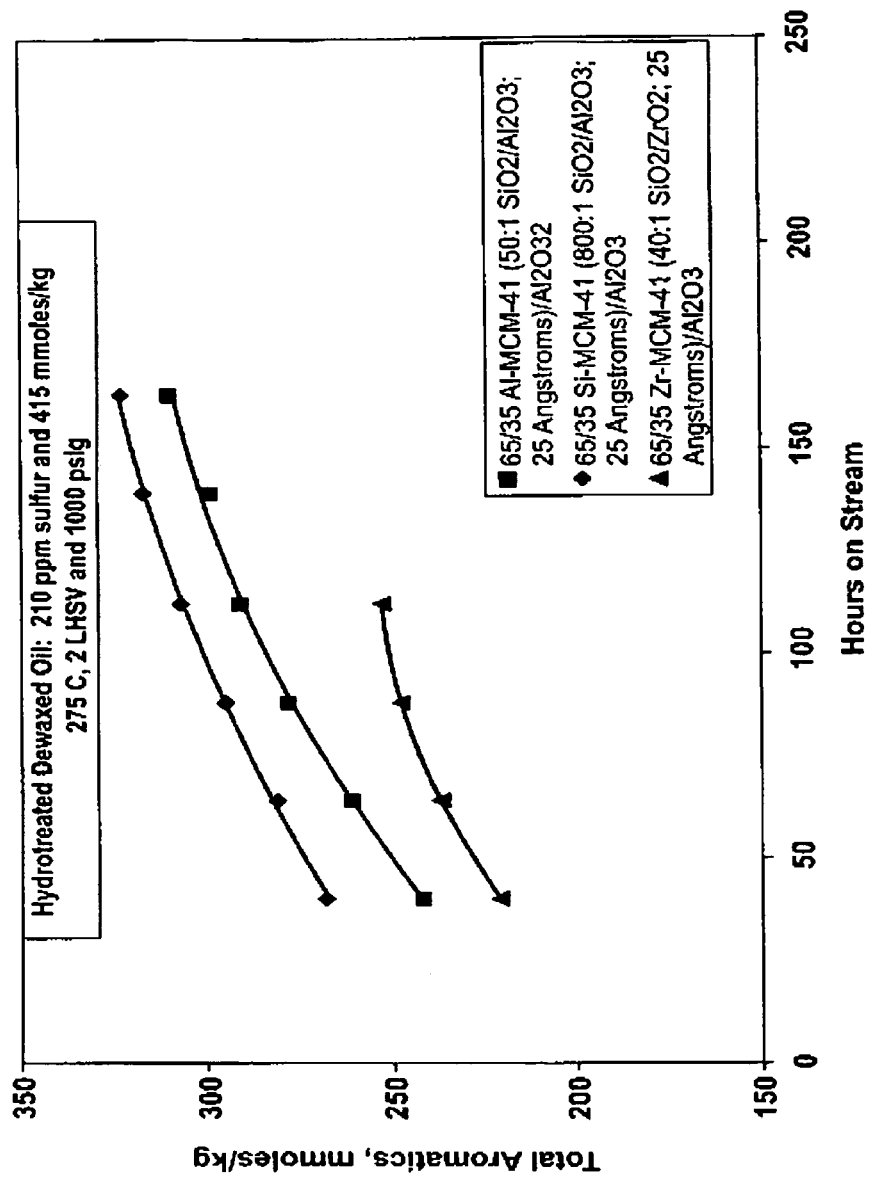
FIG. 9 depicts results from aromatic saturation of a hydrocarbon feedstock by various catalysts.

To verify that a similar activity boost is observed for the Zr-containing MCM-41 catalyst, an aromatics saturation process similar to the process used in FIG. 7 was performed on the Zr-containing MCM-41 catalyst from Table 1, the Si-MCM-41 catalyst, and the Al-MCM-41 catalyst with the ~50:1 $SiO_2$/$Al_2O_3$ ratio. FIG. 9 shows the relative activity of each of the catalysts for performing aromatic saturation on a dewaxed 600N lubricating oil feedstock containing 210 ppm sulfur and 415 mmoles/kg of aromatics. The dewaxed oil feedstock was processed at 275° C., 2 LHSV, and 1000 psig for the period of time shown in FIG. 9. As shown in FIG. 9, the Zr-containing MCM-41 catalyst provided greater saturation of aromatics relative to the saturation performance of the Al-MCM-41 or Si-MCM-41 catalysts.

Example 10

Acidity of MCM-41 Catalysts

In addition to improvements in aromatic saturation activity, Ti-containing MCM-41 catalysts also have a lower acidity than Si-MCM-41 or Al-MCM-41 catalysts when bound with alumina. Lowering the acidity of the catalyst reduces the number of side reactions caused by the catalyst during a hydrofinishing or aromatic saturation process, such as hydrocracking. Thus, a lower acidity hydrogenation or aromatic saturation catalyst will have a higher selectivity for performing a desired hydrogenation process while reducing hydrocracking reactions that would lead to yield loss and/or undesirable changes in the properties of the processed feed.

In order to demonstrate the lower acidity of Ti-containing MCM-41 catalysts, a model compound study was carried out based on isomerization of 2-methyl-2-pentene (2MP2). The 2MP2 isomerization reactions are useful as a model system as the reactions allow for a study of both the number of acid sites as well as the acidity strength of the sites. 2MP2 can undergo isomerization to 4-methyl-2-pentene (4MP2), 3-methyl-2-pentene (3MP2), 2,3, dimethyl-2-butene (23DMB2), and a series of other isomers. This isomerization is facilitated by the presence of acidic catalyst sites. The rates of conversion to 3 MP2, 4 MP2, and 23DMB2 can be measured and the information used to identify relative numbers of acid sites and the relative acidities of the sites. For example, higher relative rates of production for CT3MP2 or 23DMB2 indicate that a catalyst has a greater number of acid sites. The acidity of the available acid sites is indicated by the Rate Ratio of either CT3MP2/CT4MP2 or 23DMB2/CT4MP2, with higher values indicating higher acid strengths.

A series of alumina bound MCM-41 catalyst materials were tested with a model 2-methyl-2-pentene (2MP2) feed. The feed was exposed to 1.0 grams of each catalyst under conditions of 1.0 atm, 250° C., and 2.4 WHSV for 2 hours on feed. The catalysts include a Ti-containing MCM-41 catalyst, an Al-MCM-41 catalyst, and an Si-MCM-41 catalyst with a 65/35 binder ratio of $SiO_2$:$Al_2O_3$, another Si-MCM-41 catalyst with a 50/50 binder ratio, and an Si-MCM-41 catalyst that has Pt and Pd deposited on the surface. An amorphous silica-alumina catalyst with a 87/13 $SiO_2$:$Al_2O_3$ ratio is also provided for comparison as a reference for a bound catalyst.

Table 2 shows the reaction rates for conversion by each catalyst of 2MP2 into CT4MP2, CT3MP2, and 23DMB2. As shown in Table 1, the Ti-MCM-41 catalyst shows a reduced number of acid sites based on the relative rates of production of CT3MP2 and 23DMB2. Thus, the Ti-containing MCM-41 catalyst should have a lower effective acidity on the basis of having fewer acidic sites available.

TABLE 2

| Catalyst | Conv % | Rates (mole/hr/gm × $10^3$) | | |
|---|---|---|---|---|
| | | CT4MP2 | CT3MP2 | 23DMB2 |
| $SiO_2$/$Al_2O_3$ 87/13 | 73.6 | 2.57 | 9.90 | 1.21 |
| Si-MCM-41 65/35 $Al_2O_3$ | 75.4 | 2.38 | 9.97 | 1.02 |
| Si-MCM-41 50/50 $Al_2O_3$ | 77.0 | 2.23 | 9.47 | 1.32 |
| Ti-containing MCM-41 65/35 $Al_2O_3$ | 68.8 | 2.96 | 8.57 | 0.65 |
| Al-MCM-41 65/35 $Al_2O_3$ | 76.1 | 2.28 | 9.95 | 1.24 |
| Pt/Pd Si-MCM-41 65/35 $Al_2O_3$ | 74.7 | 2.52 | 9.71 | 1.10 |

Table 3 shows the ratio of reaction rates for conversion of 2MP2 by each of the catalysts into CT4MP2, CT3MP2, and 23DMB2. The calculated equilibrium value for the Rate Ratio based on reaction barrier heights for the conversion reactions is also shown for comparison. As shown in Table 3, the acid sites of the Ti-containing MCM-41 catalyst are also lower in acidity, as shown by the Rate Ratio values. In combination with the values from Table 2, this shows that the Ti-containing MCM-41 catalyst has both fewer acid sites and lower acidity acid sites. This demonstrates the overall lower acidity of Ti-containing MCM-41 relative to either the silica-alumina binder and the other forms of MCM-41, and therefore the higher expected selectivity for aromatic saturation versus hydrocracking reactions.

TABLE 3

| Catalyst | Rate Ratio | |
|---|---|---|
| | CT3MP2/CT4MP2 | 23DMB2/CT4MP2 |
| $SiO_2/Al_2O_3$ 87/13 | 3.85 | 0.47 |
| Si-MCM-41 65/35 $Al_2O_3$ | 4.18 | 0.43 |
| Si-MCM-41 50/50 $Al_2O_3$ | 4.25 | 0.59 |
| Ti-containing MCM-41 65/35 $Al_2O_3$ | 2.90 | 0.22 |
| Al-MCM-41 65/35 $Al_2O_3$ | 4.36 | 0.52 |
| Pt/Pd Si-MCM-41 65/35 $Al_2O_3$ | 3.85 | 0.44 |
| Equilibrium Value | 4.4 | 1.2 |

Another way of characterizing the acidity of a catalyst or catalyst support is via a collidine adsorption test. Collidine is the common name for 2,4,6-trimethylpyridine. A collidine adsorption test is a characterization tool that can be used to determine the acidity of large pore zeolite and/or mesoporous materials. MCM-41 is an example of a mesoporous material. A material that adsorbs a larger amount of collidine corresponds to a material with a greater number of accessible acid sites.

The number of acid sites in various types of MCM-41 materials (without a binder) was determined by the adsorption of collidine at 200° C. The MCM-41 materials investigated were Al-MCM-41 (Si/$Al_2$ ratio of ~40:1); Ti-containing MCM-41 (Si/$Ti_2$ ratio of ~40:1); Zr-containing MCM-41 (Si/$Zr_2$ ratio of ~40:1); and Si-MCM-41 (Si/$Al_2$ ratio greater than ~600:1). The collidine adsorption values, in μmole of collidine per gram of MCM-41, are shown in Table 4 below.

TABLE 4

| | Collidine adsorption (μmole/g) |
|---|---|
| Al-MCM-41 (~40:1) | 242 |
| Ti-containing MCM-41 (~40:1) | 96 |
| Zr-containing MCM-41 (~40:1) | 62 |
| Si-MCM-41 (greater than about 600:1) | 13 |

As shown in Table 4, the Al-MCM-41 support clearly has the highest acidity. This agrees with the Rate Ratio data in Table 1, which also indicated that Al-MCM-41 had the highest acidity. Using the collidine adsorption test, Ti-containing and Zr-containing MCM-41 had the next highest acidities, while Si-MCM-41 showed the lowest acidity. Based on the collidine adsorption data, Zr-containing and Ti-containing MCM-41 have similar numbers of acid sites. It is believed that Zr-containing and Ti-containing MCM-41 material will exhibit similar acidity characteristics for processes where acidity influences reaction scheme.

What is claimed is:

1. An aromatics hydrogenation process for a hydrocarbon feedstream comprising:

a) contacting a hydrocarbon feedstream that contains aromatics with a hydrogenation catalyst in the presence of a hydrogen-containing treat gas in a first reaction stage operated under effective aromatics hydrogenation conditions, the effective aromatics hydrogenation conditions comprising a temperature of about 190° C. or less, wherein said hydrogenation catalyst comprises:
  i) an inorganic porous crystalline phase material comprising MCM-41 and having, after calcination, a hexagonal arrangement of uniformly-sized pores having diameter of at least about 15 Angstroms to about 25 Angstroms and exhibiting a hexagonal diffraction pattern that can be indexed with a $d_{100}$ value greater than about 18 Angstroms, wherein the inorganic porous crystalline phase material contains $SiO_2$ and $XO_2$, where X is selected from Ti, Zr, or a combination thereof, and the inorganic porous crystalline phase material is formed from a synthesis mixture having a ratio of $SiO_2:XO_2$ of about 100:1 or less, and
  (ii) at least one hydrogenation-dehydrogenation component selected from the Group VIII noble metals.

2. The process of claim 1, wherein the inorganic porous crystalline phase material is MCM-41.

3. The process of claim 2, wherein the Group VIII noble metal is Pt, Pd, Ir, Rh, or a combination thereof.

4. The process according to claim 2, wherein the ratio of $SiO_2:XO_2$ in the synthesis mixture for forming the inorganic porous crystalline phase material is from about 7.5:1 to about 100:1.

5. The process according to claim 2, wherein said hydrogenation catalyst further comprises a binder material selected from active and inactive materials, inorganic materials, clays, alumina, silica, silica-alumina, titania, zirconia, or a combination thereof.

6. The process according to claim 5 wherein said binder material is selected from silica-alumina, alumina, titania, or zirconia.

7. The process according to claim 2, wherein the hydrocarbon feedstream is a hydrocarbon fluid, a diesel boiling range feedstream, or a lube oil boiling range feedstream.

8. The process according to claim 2, wherein said hydrogenation-dehydrogenation component is present in an amount ranging from about 0.1 to about 2.0 wt. %.

9. The process according to claim 8, wherein said hydrogenation-dehydrogenation component is selected from palladium, platinum, and mixtures thereof.

10. The process according to claim 1, wherein said hydrocarbon feedstream is derived from crude oils, shale oils and tar sands as well as synthetic feeds and is selected from hydrocarbon feedstreams having an initial boiling points of about 315° C. or higher.

11. The process according to claim 10 wherein said hydrocarbon feedstream contains up to 0.2 wt. % of nitrogen, up to 3.0 wt. % of sulfur, and up to about 50 wt. % aromatics, all based on the hydrocarbon feedstream.

12. The process according to claim 1 wherein said hydrocarbon feedstream has a sulfur content below about 500 wppm.

13. An aromatics hydrogenation process for hydrocarbon feedstreams comprising:

a) contacting a hydrocarbon feedstream containing aromatics, nitrogen and organically bound sulfur contaminants in a first reaction stage operated under effective hydrotreating conditions and in the presence of hydrogen-containing treat gas with a hydrotreating catalyst comprising about at least one Group VIII metal oxide and at least one Group VI metal oxide thereby producing a reaction product comprising at least a vapor product and a liquid hydrocarbon product; and b) contacting said reaction product with a hydrogenation catalyst in the presence of a hydrogen-containing treat gas in a second reaction stage operated under effective aromatics hydrogenation conditions, the effective aromatics hydrogenation conditions comprising a temperature of about 190° C. or less, wherein said hydrogenation catalyst comprises:
   i) an MCM-41 support material having a crystalline framework that contains $SiO_2$ and $XO_2$, where X is selected from Ti, Zr, or a combination thereof, the MCM-41 support material being formed from a synthesis mixture having a ratio of $SiO_2$:$XO_2$ in the synthesis mixture of 100:1 or less; the support material having a hexagonal arrangement of uniformly-sized pores having diameter of about 15 Angstroms to about 25 Angstroms; and
   ii) at least one hydrogenation-dehydrogenation component selected from the Group VIII noble metals.

14. The process according to claim 13 wherein said MCM-41 support material is composited with a binder material.

15. The process according to claim 14 wherein said binder material is selected from active and inactive materials, synthetic zeolites, naturally occurring zeolites, inorganic materials, clays, alumina, and silica-alumina.

16. The process according to claim 13 wherein said hydrogenation-dehydrogenation component is present in an amount ranging from about 0.1 to about 2.0 wt. %.

17. The process according to claim 13 wherein said hydrogenation-dehydrogenation component is selected from platinum, palladium, and mixtures thereof.

18. The process according to claim 13 wherein said process further comprises: a) separating said vapor product from said liquid hydrocarbon product; and b) conducting said liquid hydrocarbon product to the second reaction stage containing said hydrogenation catalyst.

19. A method for hydroprocessing a hydrocarbon feedstream comprising:
   a) contacting a hydrocarbon feedstream containing aromatics in a first reaction stage operated under effective catalytic dewaxing conditions and in the presence of hydrogen-containing treat gas with a dewaxing catalyst thereby producing a reaction product; and
   b) contacting said reaction product, the reaction product having a sulfur content of from about 210 wppm to about 500 wppm, with a hydrogenation catalyst in the presence of a hydrogen-containing treat gas in a second reaction stage operated under effective aromatics hydrogenation conditions, the effective aromatics hydrogenation conditions comprising a temperature of about 275° C. to about 400° C., wherein said hydrogenation catalyst comprises:
      i) an MCM-41 support material having a crystalline framework that contains $SiO_2$ and $XO_2$, where X is selected from Ti, Zr, or a combination thereof, the MCM-41 support material being formed from a synthesis mixture having a ratio of $SiO_2$:$XO_2$ in the synthesis mixture of 100:1 or less; the support material having a hexagonal arrangement of uniformly-sized pores having a diameter of 15 Angstroms to about 40 Angstroms; and
      ii) at least one hydrogenation-dehydrogenation component selected from the Group VIII noble metals.

20. The method of claim 19, further comprising hydrotreating the hydrocarbon feedstream under effective hydrotreating conditions prior to contacting the hydrocarbon feedstream with the dewaxing catalyst.

21. The method of claim 19, further comprising hydrofinishing the hydrocarbon feedstream under effective hydrofinishing conditions prior to contacting the hydrocarbon feedstream with the dewaxing catalyst.

22. The method of claim 21, wherein hydrofinishing the hydrocarbon feedstream prior to contacting the hydrocarbon feedstream with the dewaxing catalyst comprises exposing the feedstream to a catalyst that comprises: i) an MCM-41 support material having a crystalline framework that contains $SiO_2$ and $XO_2$, where X is a Group IV metal, the MCM-41 support material being formed from a synthesis mixture having a ratio of $SiO_2$:$XO_2$ in the synthesis mixture of 100:1 or less; and ii) at least one hydrogenation-dehydrogenation component selected from the Group VIII noble metals.

* * * * *